March 6, 1956 C. M. PERKINS 2,737,059
AUTOMATIC, SPEED RESPONSIVE, TRANSMISSION SHIFTING APPARATUS
Filed Feb. 11, 1953 7 Sheets-Sheet 1

INVENTOR.
CHARLES M. PERKINS
BY
ATTORNEY

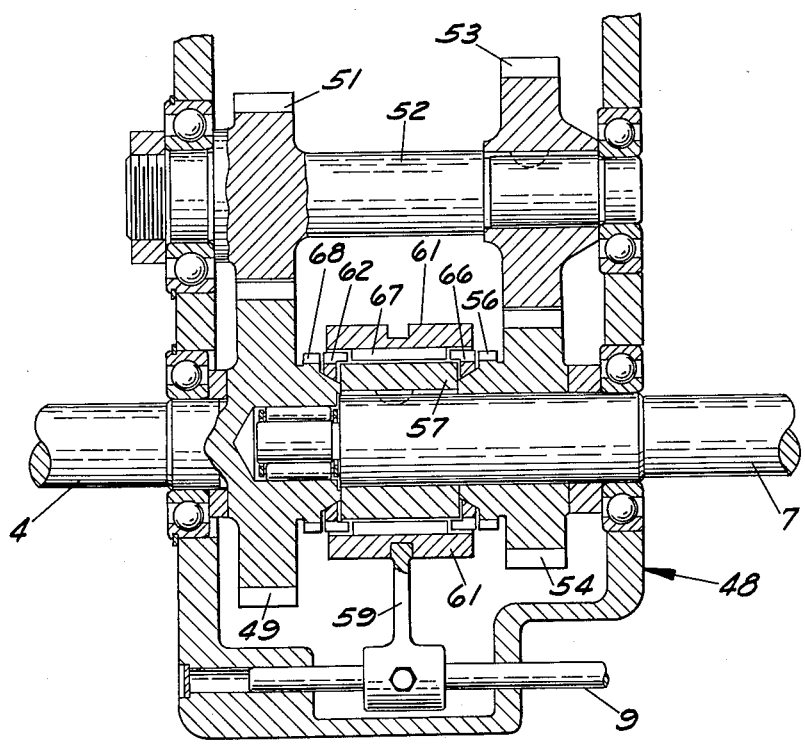
Fig. 2
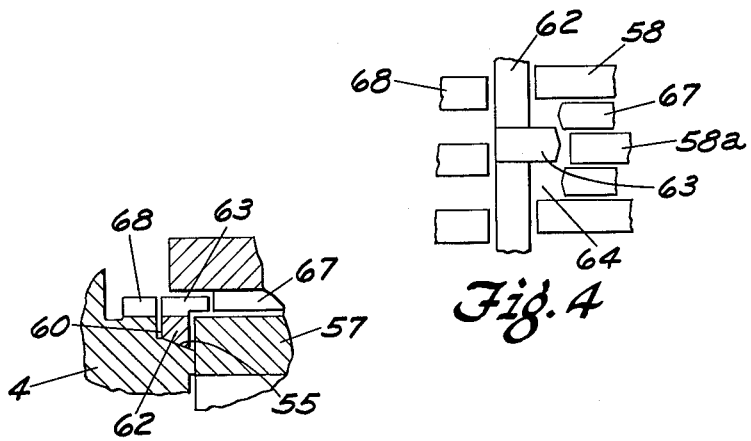
Fig. 4
Fig. 3

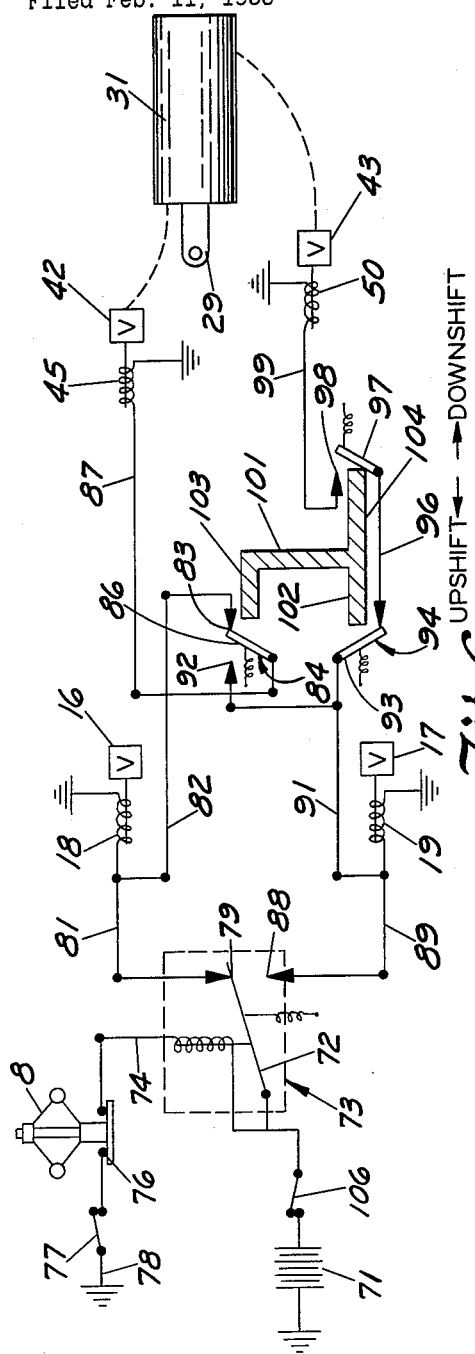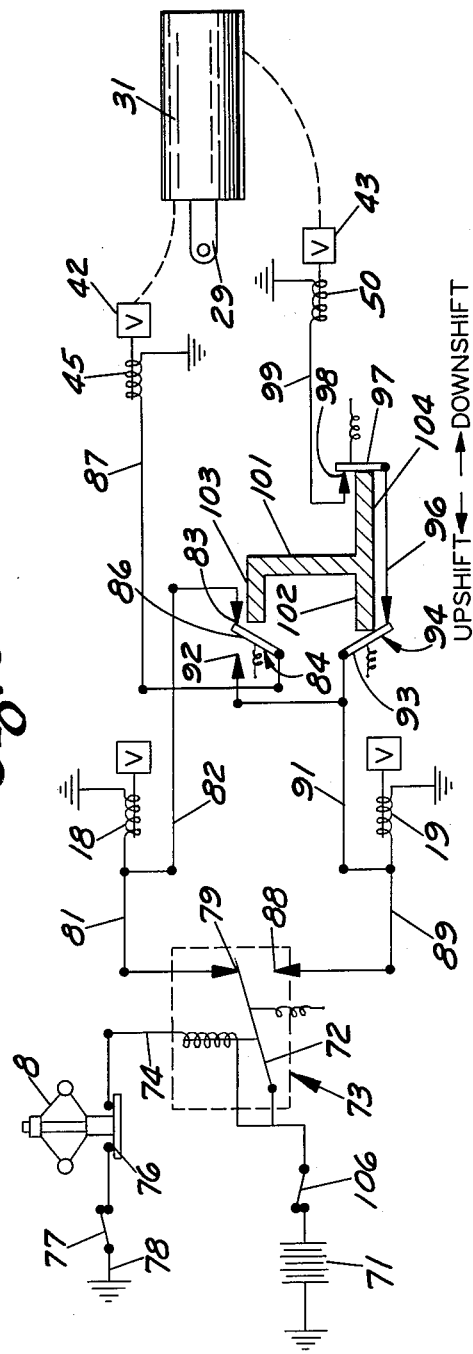

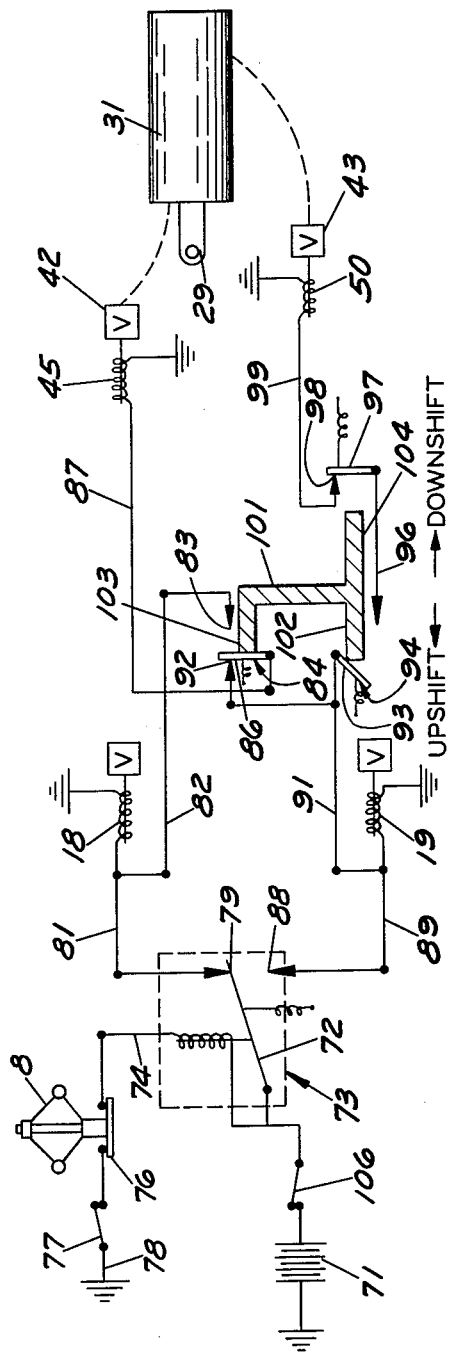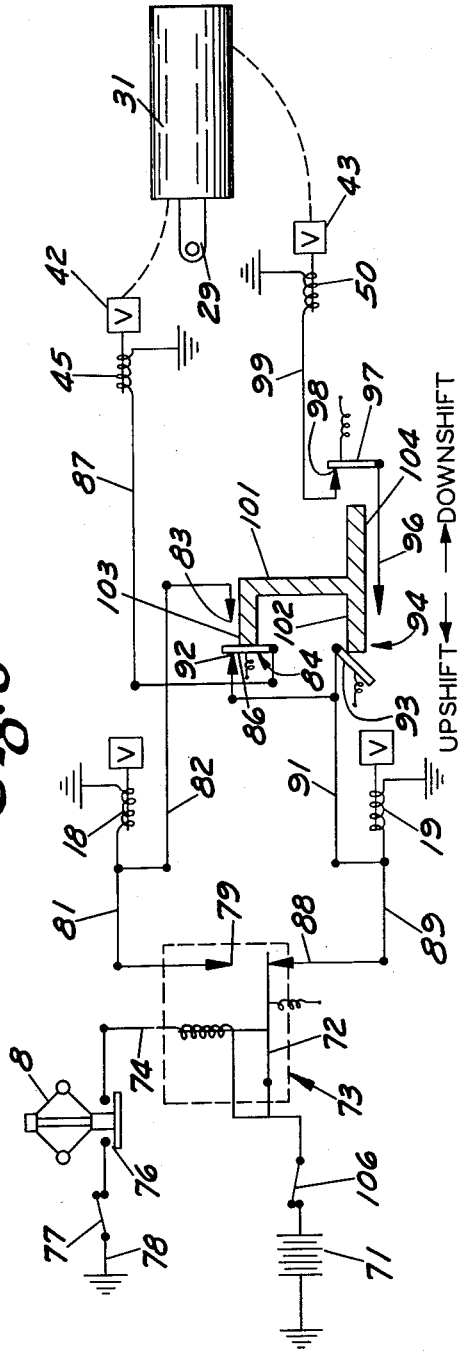
Fig. 8
Fig. 9

March 6, 1956
C. M. PERKINS
2,737,059
AUTOMATIC, SPEED RESPONSIVE, TRANSMISSION SHIFTING APPARATUS
Filed Feb. 11, 1953
7 Sheets-Sheet 6
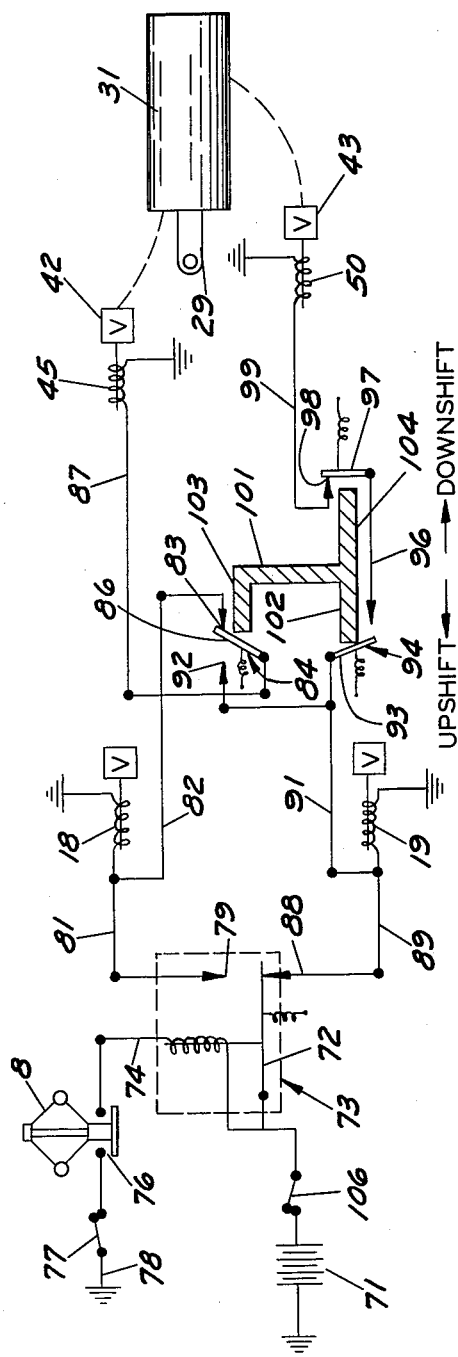
*Fig.10*
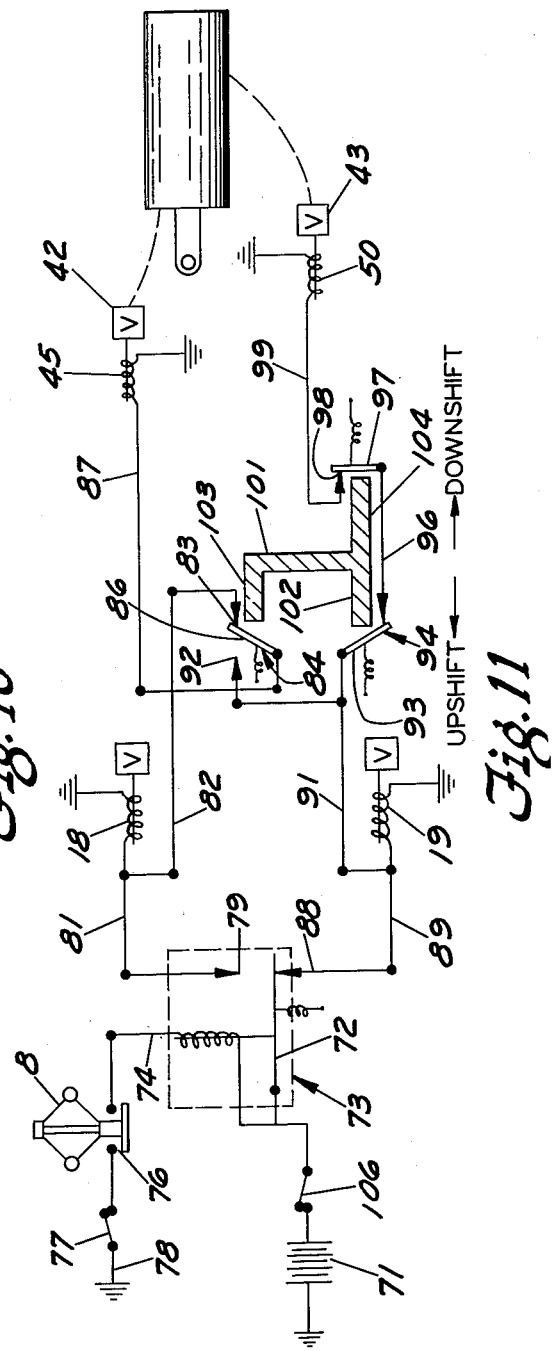
*Fig.11*
INVENTOR.
CHARLES M. PERKINS
BY
ATTORNEY United States Patent Office 2,737,059
Patented Mar. 6, 1956

2,737,059

AUTOMATIC, SPEED RESPONSIVE, TRANSMISSION SHIFTING APPARATUS

Charles M. Perkins, Oshtemo Township, Kalamazoo County, Mich., assignor to Fuller Manufacturing Company, a corporation of Delaware Application February 11, 1953, Serial No. 336,336

15 Claims. (Cl. 74—472)

This invention relates to an automatic device for effecting the shifting of a vehicular transmission, and it particularly relates to such a device, and a transmission construction consistent therewith, which will effect either an upshift or a downshift in direct response to speed of a vehicle and independently of any action by the operator.

A principal object of the invention is to provide automatic power shifting means which will be response solely to the speed of a vehicle and which neither requires nor permits participation therein by the operator.

A further object of the invention is to provide apparatus, as aforesaid, which will be positive in its operation with respect to vehicle speed.

A further object of the invention is to provide apparatus, as aforesaid, having a substantial portion thereof depending upon an electrical circuit and thereby to minimize the expense and maintenance problems frequently incident to pressure fluid actuated devices.

A further object of the invention is to provide means, as aforesaid, in which the engine may, if desired, be connected directly to the gear shifting mechanism throughout the shifting procedure and the use of a clutch, a torque converter, or other power-interrupting mechanism, may be limited to starting and stopping procedures.

A further object of the invention is to provide means responsive to the shifting operation to control the throttle of the engine appropriately to an upshift or a downshift and to do so without the intervention of an operator.

Other objects and purposes of the invention will be apparent to persons acquainted with apparatus of this general type upon a reading of the following disclosure and an inspection of the accompanying drawings.

In the drawings:

Figure 2 is a sectional view of a shiftable gear set used in said specific embodiment.

Figure 3 is a detail of Figure 2 drawn on an enlarged scale, illustrating the blocker mechanism used therein.

Figure 4 schematically illustrates the tooth pattern utilized in the blocker mechanism shown in Figure 3.

Figure 5:
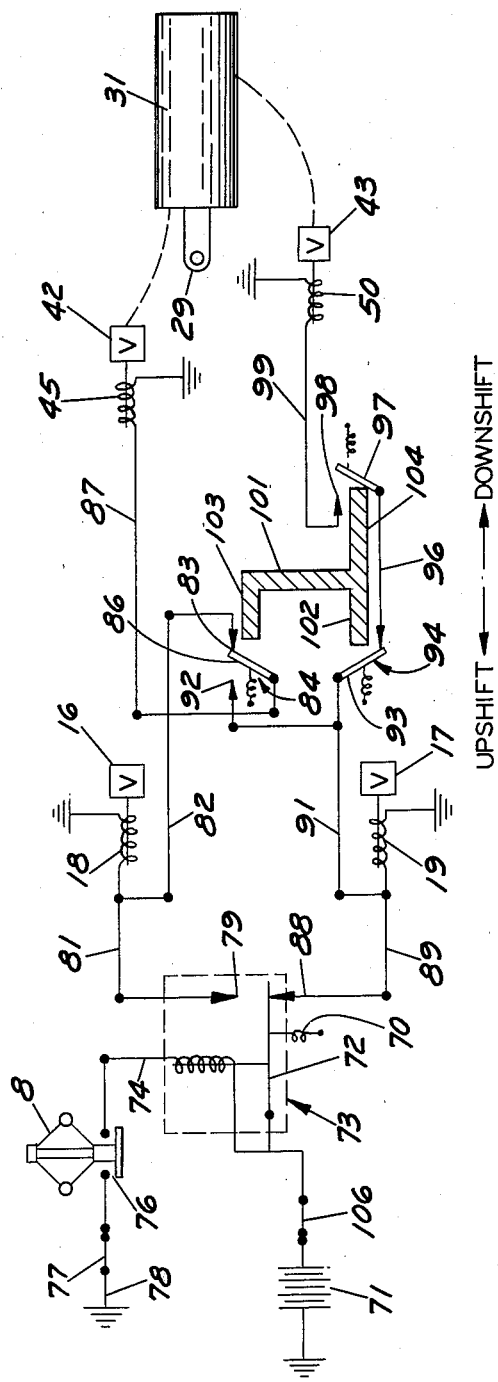

Figure 5 is a diagrammatic view of the electric circuit utilized in said embodiment, together with parts controlling, and controlled by, said circuit and showing same in a condition of rest.

Figure 6 is a diagram similar to that of Figure 5 and showing the condition of the system when the governor has reacted to an increase in speed past a critical value but before anything has happened as a consequence thereof.

Figure 7 is a diagram similar to Figure 5 and showing the first portion of movement of the shifting mechanism of the gear set in response to the governor's passing a critical speed.

Figure 8 is similar to Figure 5 and showing the condition of the equipment when said gear set has completed the shifting movement in an upshift direction.

Figure 9 is a diagram similar to Figure 5 showing a condition of the equipment as the governor drops below a predetermined speed and before the shifting mechanism moves as a consequence thereof.

Figure 10 is a diagram similar to Figure 5 showing the condition of the equipment after the shifting mechanism of the gear set has moved through the first portion of its movement in a downshift direction.

Figure 11 is a diagram similar to Figure 5 showing the position of the equipment when the shifting mechanism has moved further in a downshift direction and before completing same.

Figure 12:
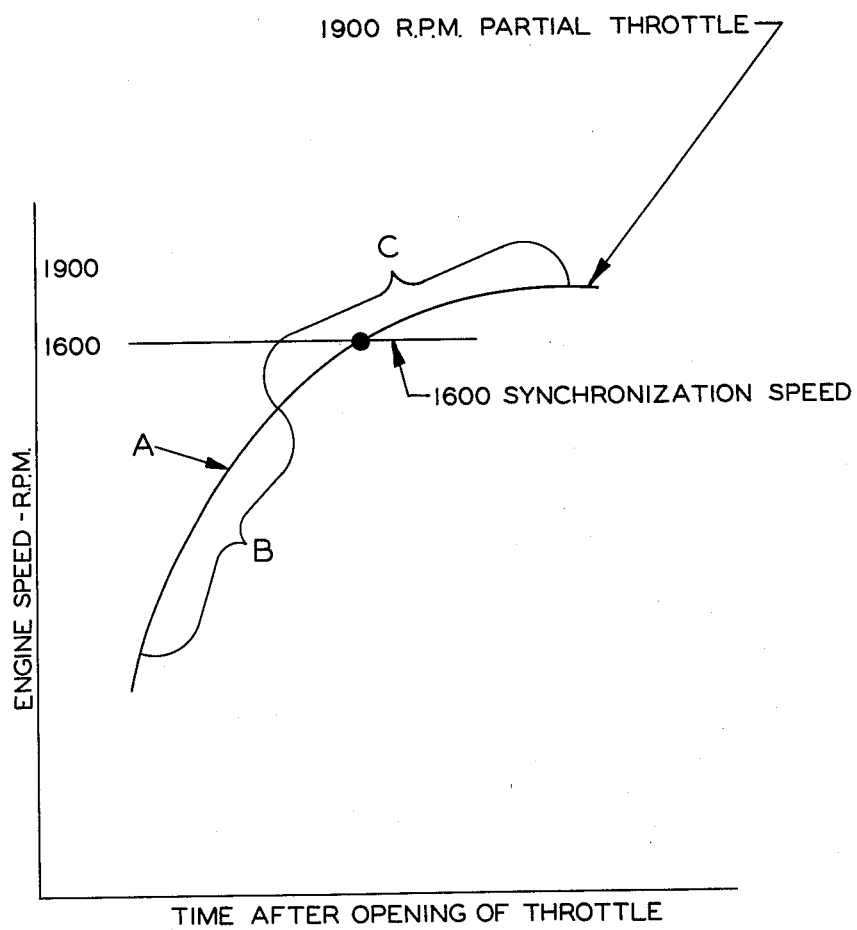

Figure 12 is a graph illustrating the relation of engine speed to time.

Among other problems incident to providing automatic transmission shifting, is the necessity of effecting substantial synchronization of the parts to be engaged. Inasmuch as the engine, prior to a downshift, will have been running more slowly than it will run when the shift is completed, it is necessary to increase its speed to a point above that at which it will be operating when the shift is completed. If this is done merely by fully opening the throttle, as has been the custom in certain automatic transmissions built in the past, the change in speed will be so rapid that the blocker mechanism either will fail to function with sufficient rapidity to effect engagement of the parts during the fraction of a second in which said parts are in substantial synchronization, or, if such functioning and engagement of said parts is secured, the shock of such engagement will be greater than it is desirable to require the parts to withstand. Therefore, the present invention contemplates opening the throttle only a portion of its full capacity in order that the engine speed will come quickly to a point close to the synchronization speed and then will increase at a less rapid rate to a point slightly above the synchronization speed. In this way, the engine speed moves through the range of substantial synchronization at a relatively low rate and engagement of the gears involved is effected smoothly and without substantial shock thereto.

In general

In meeting the objects and purposes above set forth, I have provided a transmission arrangement in which a gear set having shiftable toothed elements therein is connected to the output of a prime mover, as a gasoline or diesel engine, by means which will normally include a clutch or torque convertor. A governor is connected to the output side of said gear set and said governor controls an appropriate electrical circuit which in turn controls valve controlling solenoids. By the energization and deenergization of said solenoids, a power mechanism responsive to fluid pressure is caused to urge a shifting device of said gear set in an upshift direction upon the governor passing above a critical predetermined first speed and for shifting said shifting mechanism in a downshift direction upon the governor falling below a predetermined second speed, which second speed will normally be, but is not necessarily, lower than said first speed. Other means are provided responsive to movement of both the governor and of said shifting mechanism for opening or closing the engine throttle in response to movement of said shifting mechanism. Particularly, means are provided by which the throttle is partially, and only partially, opened during a downshift in order to enable a downshift to take place without an unreasonable burden being placed upon the apparatus. Blocking means are provided between the engageable and disengageable gears of said gear set in order to prevent engagement of said gears when same are rotating at substantially different speeds but to permit engagement thereof as said gears obtain substantially synchronous speeds. Synchronizers may be provided if desired in conjunction with said blocker mechanism, but are unnecessary and are in some respects not desirable.

Mechanical parts

Figure 1:
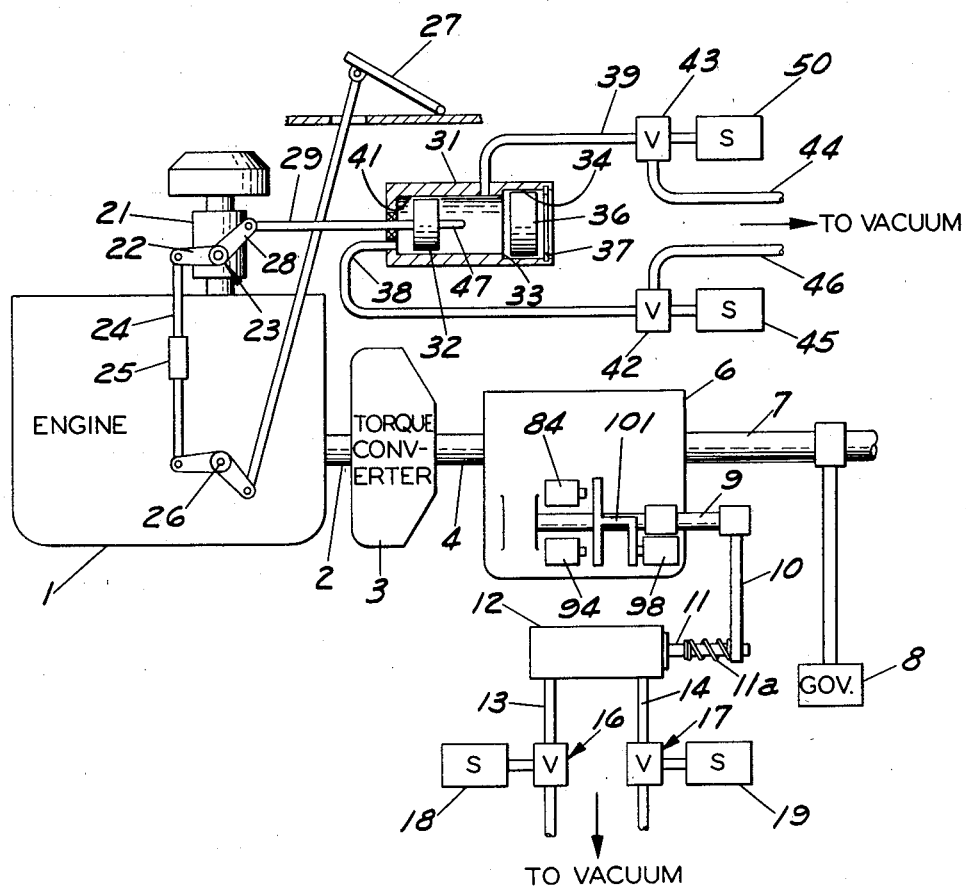
Figure 1 is a diagrammatic illustration of a specific embodiment of apparatus embodying my invention.

Referring first to the organization of the parts, as a whole, attention is directed to Figure 1. Here is shown a prime mover 1, which may be of any conventional form, as a gasoline or diesel engine. Said prime mover drives an output shaft 2 which in this embodiment is shown as driving any conventional form of torque convertor 3. It will be apparent, however, as the description proceeds, that the torque multiplication features of said torque convertor are of minor importance and that its use herein is largely as an interruptable power transmitting mechanism and it may, therefore, be replaced by other forms of such mechanisms, as a friction clutch, without change in the invention. The shaft 4 receives the output of said torque convertor and drives a transmission 6 which in this embodiment is shown as a two speed transmission. Said transmission drives an output shaft 7 from which power is conducted to the rear wheels of the vehicle, or other point of utilization, in a conventional manner.

A speed responsive governor 8 of any conventional type is operatively connected to the output shaft 7.

The shift rod 9 of the transmission, hereinafter described in more detail, is operatively connected to the plunger 11 of a fluid actuated power cylinder 12. Said power cylinder is energized by pressure fluid through the conduits 13 and 14, connected to each end thereof in a conventional manner. Said conduits are each provided with solenoid controlled valves 16 and 17 for the opening and closing of said respective conduits. In the particular embodiment herein utilized for illustrative purposes, said conduits 13 and 14 are, on the opposite side of said valves from said power cylinder 12, connected to the vacuum system of the engine with which this apparatus is being used, but it will be understood that, although vacuum is here utilized to illustrate the invention, it may as well be any other source of conveniently available fluid pressure, as oil. The solenoids 18 and 19, utilized with solenoid controlled valves 16 and 17, respectively, are of any conventional type and need not be specifically detailed.

Said engine 1 is provided with a conventional throttle controlled caburetor 21 wherein the throttle is controlled by the arm 22 of the bell crank 23. Said arm 22 is connected throug rod 24 and a resilient lost motion device 25 to the bell crank 26, which latter is in turn connected in a conventional manner to an accelerator pedal 27.

Affixed to the other arm 28 of the bell crank 23, is a rod 29 which is connected to the piston 32 of a throttle power cylinder 31. This power cylinder has a step 33 therein providing the end thereof remote from the point of entry thereinto of said rod 29 with a portion 34 of enlarged diameter. A piston 36 is held within said portion 34 by any convenient means such as the snap ring 37.

Conduits 38 and 39 lead from the smaller part 41 of said cylinder on either side of the piston 32 and connect to the solenoid controlled valves 42 and 43. Further conduits 44 and 46 then connect said valves respectively to sources of fluid energy, here the vacuum system of the engine.

The piston 32 has an extension 47 thereon extending toward the auxiliary piston 36 for reasons appearing hereinafter.

While a wide variety of transmission devices involving engageable and disengageable pairs of gears in a gear set may be adapted for use in this invention, it is convenient to illustrate the principles of the invention with the wholly conventional two speed transmission shown in Figure 2.

A casing 48 rotatably supports the transmission input shaft 4 on the inner end of which is formed a gear 49. Said gear is in constant mesh with a gear 51 on one end of the countershaft 52, which countershaft is likewise rotatably supported in the casing 48. Said gear 49 has jaw clutch teeth 68 formed on the rightward end thereof. A further gear 53 is on said countershaft and is in constant mesh with a gear 54, said gear 54 being supported on the transmission output shaft 7 and rotatable with respect thereto. Jaw clutch teeth 56 are affixed to said gear 54 and rotate therewith. A sleeve 57 is keyed to the output shaft 7, said sleeve having a plurality of eternal splines 58 thereon which splines are, in this embodiment, in radial alignment with, and of the same cross-sectional characteristics as, the jaw clutch teeth 56 and the jaw clutch teeth 68. A slider 61, provided with internal teeth 67, surrounds said sleeve 57 and is arranged to engage and slide upon said teeth 58.

It will be appreciated that upon axial movement of said slider 61 to the leftward, as appearing in Figure 2, the jaw clutch teeth 68 will be connected through said slider to the sleeve 57 and power will thereby be transmitted directly from the shaft 4 to the shaft 7. It will also be recognized that upon movement of said slider 61 rightwardly into engagement with the jaw clutch teeth 56, power transmitted from the input shaft 4 through the countershaft 52 to the gear 54 will be conducted thence through the clutch teeth 56, the slider 61 and the sleeve 57 to the output shaft 7. Thus, as appearing in this figure, movement of the slider 61 to the left effects a direct drive and may be considered an upshift movement with respect to its other shifted position, and movement of the slider to the right effects a ratio reduction between said shafts 4 and 7 and may be considered a downshift movement with respect to its other shifted position.

A conventional fork 59 engages a suitable annular recess in the slider 61. It extends, and is connected, to the shift rod 9.

Turning now to the blocker construction (Figures 3 and 4), there is provided immediately rearwardly, rightwardly as appearing in Figures 2 and 3, of the jaw clutch teeth 68 an annular recess 60 of any convenient radial depth with respect to the peripheral extremities of the gear 49. Within said recess is provided the blocker ring 62 the same being arranged therein for rotation on, and with respect to, a rightwardly extending step 55 of the gear 49. A plurality, as four, of axially elongated teeth, of which one is indicated at 63, are provided on said blocker ring 62. Each of said teeth, as the tooth 63, is inserted into a space 64 provided by shortening one tooth 58a of the sleeve to provide a circumferential lost motion connection between the sleeve 57 and said blocker ring 62.

So long as the gear 49 and the sleeve and slider assembly 57 and 61 are rotating at different speeds, the frictional drag of the blocker ring 62 against the step 55 will hold said blocker ring 62 at one end of its space 64 and will thereby provide blocking of the teeth 67 of the slide 61, as will be well understood and is illustrated in Figure 4. As the speeds cross, the teeth 63 will be momentarily aligned with the teeth 58 and the teeth 67 are thereby enabled to move past said teeth 63 and to become engaged with the teeth 68.

While the foregoing description of the blocker mechanism has been directed toward the blocker mechanism associated with the gear 49, it will be appreciated, and is generally illustrated in Figure 2, that a similar blocker mechanism 66 is located at the other end of the sleeve 57 and in operative association with the jaw clutch teeth 56.

The electric system

Turning now to the electric system, and the parts associated therewith (Figure 5), there is shown a battery, or other source of electrical power, 71 connected on one side to ground and on the other side to the armature 72 of a single pole, double throw, relay 73. Resilient means, as a spring 70, are provided for holding the armature 72 of the relay 73 normally against the contact 88 thereof.

A switch 106 may, if desired, be provided between the relay 73 and the battery 71, which is preferably so connected to the ignition switch that it will be open when the vehicle is not in operation and thereby protect the battery from unnecessary depletion. A conductor 74 connects the winding of said relay to ground through a switch 76 which is opened and closed by operation of the governor 8 at predetermined speeds. For illustrative purposes, the governor is arranged to close said switch 76 at 20 miles per hour and open said switch at 16 miles per hour. A hand operated switch 77, which may be placed upon the instrument panel of the vehicle is interposed, if desired, between the governor switch 76 and the ground connection 78.

The upshift contact 79 of the relay 73 is connected through the winding of the solenoid 18 to ground. Said contact 79 is also connected through the conductor 81 and the conductor 82 to a contact 83 of a single pole, double throw, spring loaded switch 84. The spring of said switch 84 is so arranged as to hold the armature 86 of said switch normally against said contact 83. The armature 86 of said switch is connected by the conductor 87 through the winding of the solenoid 45 to ground.

The downshift contact 88 of the relay 73 is connected by the conductor 89 through the winding of the solenoid 19 to ground. Said contact 88 is also connected through the conductor 89 and the conductor 91 to the contact 92 of the switch 84 and also to the armature 93 of a single pole, single throw, spring biased switch 94. The biasing of said switch 94 is of such character as to hold said switch normally closed. The contact of said switch 94 is connected by a conductor 96 to the armature 97 of a normally closed switch 98. The contact of said switch 98 is connected by the conductor 99 through the winding of the solenoid 50 to ground.

Said spring biased switches 84, 94, and 98 are mounted adjacent the shift rod 9 and any convenient means, as a switch actuator 101, is mounted thereon for actuating said switches. As will be developed more fully hereinafter, said switches and said switch actuator are so related to each other that when the transmission 6 is in its direct drive position, the arm 102 of said actuator holds the switch 94 open, the arm 103 of said actuator holds the armature 86 of the switch 84 against the contact 92 thereof and the arm 104 has retracted sufficiently to permit closing of the switch 98. When the shift rod 9 is in an intermediate position between its one shifted position and its other shifted position, the said switch actuator 101 is free from contact with any of the adjacent switch armatures. When said shift rod 9 is in its position for effecting a gear ratio connection between the input shaft 4 and the output shaft 7 of the transmission, then the actuator arm 104 contacts the armaure 97 of the switch 98 to hold the same open, the switch 94 is permitted to close and the armature 86 of switch 84 is permitted to close against the contact 83.

*Operation*

With the engine of the vehicle operating at idling speed and the switches 106 and 77 closed, the apparatus will be in the condition shown in Figure 5 which may be considered its "at rest" condition. In such condition, the relay contact 88 is closed and the solenoid 19 is accordingly energized. This places vacuum at the rightward end of the shifting cylinder 12 (Figure 1) and thereby holds, or urges, the sleeve 57 (Figure 2) rightwardly and the shifting mechanism accordingly in its low ratio position. With the switch 84 open at the contact 92 and the switch 98 also open, nothing other than the solenoid 19 will be energized. With the speeding up of the engine, power will be transmitted through the torque convertor and the vehicle will start in low gear. If, however, a clutch is used in place of the torque convertor the clutch may be engaged in the conventional manner and the vehicle will start in low gear. Normal control of the throttle of the engine is had by the foot pedal 27. The resilient means within the lost motion mechanism 25 is sufficiently stiff that normal control of the throttle by said foot pedal will not be impaired.

As the vehicle speed increases to the selected value, here 20 M. P. H., and passes same, the governor 8 will close the switch 76. This energizes the winding of the relay 73 and holds the armature thereof away from the downshift contact 88 and against the upshift contact 79. This deenergizes the solenoid 19 and energizes the solenoid 18. The energization of the solenoid 18 opens the valve 16 and thereby imposes vacuum on the leftward end of the power cylinder 12 and this tends to move the shifting mechanism, including the shift rod 9 and the switch actuator 101 leftwardly. This condition, prior to the beginning of such movement, is illustrated in Figure 6. It also energizes the solenoid 45 which places vacuum on the leftward end of cylinder 31 (Figure 1) and closes the throttle. Because of the resilient connection 25, the cylinder 31 will close the throttle effectively, and thus insure reversal of torque and easy disengagement of the gears, regardless of the operator's manipulation of the accelerator pedal 27.

As the shift rod 9 moves leftwardly in response to the urging of the power cylinder 12, the switch actuator 101 first moves into position shown in Figure 7, in which the switch 98 has closed but the switch actuator 101 has not moved sufficiently to open the switch 94 or the contact 83 of the switch 84. Thus, the circuit is now broken not only through the solenoid 19, but also through the solenoid 50, and the circuit through the solenoid 18 remains established and the circuit through the solenoid 45 likewise remains established. Thus, the throttle remains closed and the shift rod 9 continues to be urged leftwardly for shifting into direct drive. The engine, due to the closed throttle, diminishes its speed but so long as the sleeve 57 and the gear 49 are rotating at different speeds the blocker ring 62 will function to prevent engagement thereof. However, as soon as the speeds of said respective parts cross, then, in a well known manner, the blocker ring will shift and permit the teeth 67 of the sleeve 57 to pass and engage the teeth 68 of the gear 49. When this happens, the control system will be in the condition shown in Figure 8. The relay 73 still makes contact at the contact 79 but the switch actuator 101 is now moved sufficiently to open the switch 94 and to move the armature of the switch 84 against the contact 92. The switch 98 remains closed. Thus, the solenoid 18 remains energized and the shift rod 9 is thus constantly and positively held by vacuum through conduit 13 in a position to hold the gear set in its direct connected position, but the solenoid 45 is deenergized thereby permitting the valve 42 to close and the power cylinder 31 to become deenergized. This releases the throttle from the control of the power cylinder and permits the operator, acting through the pedal 27 to resume control of the throttle. The shift is thus completed.

Now, assuming that the speed drops below a predetermined point, as 16 M. P. H. in the specific embodiment herein used to illustrate the invention, the first result will be the opening of the switch 76 in response to falling of the fly-balls of the governor 8 and thereby to effect deenergization of the relay 73 (Figure 9). This permits the armature 72 thereof to respond to the spring bias and to move away from the upshift contact 79 and against the downshift contact 88. This deenergizes the solenoid 18 and thereby permits the closing of the valve 16 and thereby effects a termination of vacuum in the conduit 13. The closing of the circuit through the contact 88 energizes the solenoid 19 and thereby opens the valve 17 and imposes vacuum through the conduit 14 to the rightward end of the power cylinder 12 (as illustrated in Figure 1) and thus urges the plunger 11 thereof in a rightward direction, that is, the direction in which the sleeve 61 will release its contact with the gear 49 and eventually become connected with the jaw clutch teeth 56, whereby to place the gear set in gear reduction position.

The closing of the contact 88 also acts through the closed switch 84 to energize the solenoid 45 and this effects a closing of the engine throttle in the manner detailed above with respect to an upshift. This releases the torque momentarily and sufficiently to permit the engaged jaw clutch teeth 68 and 67 to separate. The sleeve 61 and the parts associated therewith including the switch actuator 101 then move rightwardly and are momentarily in the position shown in Figure 10. The switch 84 is now open at its contact 92, thus deenergizing the solenoid 45.

The shift rod 9 continues moving to the right until the teeth 67 of the slider 61 are against the blocker ring 66 associated with the jaw clutch teeth 56 and the switch actuator 101 moves to the position shown in Figure 11. In this position, with the solenoid 45 remaining deenergized, both of the switches 94 and 98 are now closed and the solenoid 50 is energized. This opens the valve 43 and permits vacuum to be imposed through the conduit 39 to the power cylinder 31 and this results in (1) moving the piston 32 rightwardly and (2) moving of the stop piston 36 leftwardly. Inasmuch as the cross sectional area of the stop piston 36 is larger than that of the piston 32, said stop piston 36 will move against the shoulder 33 and constitute an abutment to arrest the projection 47 and thereby act as a limit to the piston 32. Thus, the throttle is opened a predetermined amount but is opened no more than such predetermined amount. As the engine now speeds up in response to said partial opening of the throttle, and with the teeth 67 of the sleeve 61 being constantly urged against the blocker ring 66, the speeds of said sleeve and said jaw clutch 56 will presently cross, the blocker ring will move out of blocking position and engagement of the sleeve 61 with the jaw clutch teeth 56 will be completed. The transmission is now in its reduction position and the parts have returned to the position shown in Figure 5.

The usefulness of partially opening the throttle on a downshift is further illustrated by Figure 12 in which the horizontal line represents time and the vertical line represents engine speeds. It will be noted that when the throttle is opened to the partially open position permitted by the positioning of the plunger 36, the engine speed at first rises rapidly to a point approaching the synchronization speed, zone B on the line A of Figure 12, and then it moves through the synchronization range at a substantially lesser rate, zone C on the line A. Thus, interengagement of the sleeve 61 with the jaw clutch teeth 56 is effected smoothly and without substantial shock.

The advantageous results above set forth for utilizing partial throttle on a downshift, as above set forth, are thereby attained.

While I have utilized a preferred embodiment of the invention for illustrating and describing same, it will be appreciated that many variations thereof will occur to those acquainted with apparatus of this type and that all of such variations will be included within the scope of the hereinafter appended claims excepting as said claims by their own terms expressly require otherwise.

I claim:

1. In a transmission for a motor vehicle including an engine and means controlling the speed of said engine, the combination comprising: a change speed gear set driven by said engine and having a pair of shiftable toothed elements, said gear set including means operable with the respective toothed elements of said pair of shiftable toothed elements for preventing engagement of said pair of toothed elements when the teeth thereof are rotating at other than substantially synchronous speeds; a shifter arranged for shifting said pair of toothed elements; first fluid pressure operated means connected to said shifter for engaging and disengaging said pair of shiftable toothed elements; second fluid pressure operated means connected to said means controlling the speed of said engine for actuating same; electric means including switches responsive to the output speed of said gear set for activating said first and second fluid pressure means and other means responsive to the position of said gear set for opening said switches and thereby terminating activation of said second fluid pressure means.

2. In a transmission for a motor vehicle including an engine and means controlling the speed of said engine, the combination comprising: a change speed gear set having pairs of shiftable jaw clutches, said gear set including a balk ring construction between the teeth of said pairs of shiftable jaw clutches for preventing engagement of a given pair of jaw clutches when the teeth thereof are rotating at other than substantially synchronous speeds; power transmitting means driven by said engine for driving said gear set; a shifter arranged for shifting said pairs of jaw clutches; first fluid pressure operated means connected to said shifter for engaging and disengaging said pairs of shiftable jaw clutches; second fluid pressure operated means controlling the speed of said engine for actuating same; control means responsive to the attaining of a first predetermined speed by the output of said gear set for activating said first and second fluid pressure means and other control means responsive to the position of said gear set for terminating activation of said second fluid pressure means; completion of movement in one of said upshift and downshift directions by said shifter presetting said control means and said other control means to effect proper sequence of events upon a subsequent attaining from an opposite direction of a second predetermined speed by the output of said gear set.

3. In a transmission for a motor vehicle including an engine and a throttle controlling said engine, the combination comprising: a change speed gear set having pairs of shiftable toothed elements, said gear set including a balk ring construction between the said elements of said pairs of shiftable toothed elements for preventing engagement of a given pair of toothed elements when the toothed elements are rotating at other than substantially synchronous speeds; interruptable power transmitting means driven by said engine for driving said gear set; a shifter arranged for shifting said pairs of toothed elements; first fluid pressure operated means connected to said shifter for engaging and disengaging said pairs of shiftable toothed elements; second fluid pressure operated means connected to said throttle for opening and closing same; means responsive to the output speed of said gear set for activating said first and second fluid pressure means and other means responsive to the position of said gear set for terminating activation of said second fluid pressure means; said means for activating said first and second fluid pressure means including means engaged by said shifter during an upshift for actuating said second fluid pressure operated means to close said throttle and other means actuated by said shifter during a downshift for actuating said second fluid pressure operated means for partially, but not fully, opening said throttle.

4. In a transmission for a motor vehicle including an engine and speed control means including a throttle for controlling the speed of said engine, the combination comprising: a change speed gear set having pairs of shiftable jaw clutches, said gear set including means operable with the jaw clutches of said pairs of shiftable jaw clutches for preventing engagement of a given pair of jaw clutches when the clutches are rotating at other than substantially synchronous speeds; means driven by said engine driving said gear set; a shifter arranged for shifting said pairs of jaw clutches; first fluid pressure operated means connected to said shifter for engaging and disengaging said pairs of shiftable jaw clutches, second fluid pressure operated means connected to said speed control means for actuating same; control means responsive to a first predetermined output speed of said gear set for activating said first and second fluid pressure means and other control means responsive to the position of said gear set for terminating activation of said second fluid pressure means; said last named means adapted for actuating said speed control means to first decrease and then increase the engine speed during a downshift and to decrease said engine speed to its idling speed during an upshift and said last named means operable wholly independently of the will of an operator; completion of movement in one of said upshift and downshift directions by said shifter presetting said control means and said other control means to effect proper sequence of events upon the subsequent crossing of a second predetermined output speed by said gear set.

5. In a transmission for a motor vehicle including an engine and a throttle controlling said engine, the combination comprising: a change speed gear set having pairs of shiftable jaw clutches, said gear set including a balk ring construction between the engageable members of said pairs of shiftable jaw clutches for preventing engagement of a given pair of jaw clutches when the jaw clutches are rotating at other than substantially synchronous speeds; interruptable power transmitting means driven by said engine for driving said gear set; a shifter arranged for shifting said pairs of jaw clutches; first fluid pressure operated means connected to said shifter for engaging and disengaging said pairs of shiftable jaw clutches; second fluid pressure operated means connected to said throttle for opening and closing same; control means responsive to a first predetermined output speed of said gear set for activating said first and second fluid pressure means and other control means responsive to the position of said gear set for terminating activation of said second fluid pressure means; said last named means adapted for first closing and then partially, but not fully, opening said throttle during a downshift and for closing said throttle to idling position during an upshift and said last named means operable wholly independently of the will of an operator; completion of movement in one of said upshift and downshift directions by said shifter presetting said control means and said other control means to effect proper sequence of events upon a subsequent crossing of a second predetermined output speed by said gear set.

6. In a transmission for a motor vehicle including an engine, a throttle controlling said engine, the combination comprising; a change speed gear set driven by said engine and having pairs of shiftable jaw clutches, said gear set including means associated with the engageable parts of said pairs of shiftable jaw clutches for preventing engagement of a given pair of jaw clutches when the jaw clutches are rotating at other than substantially synchronous speeds; a shifter including a shifting cylinder arranged for shifting said pairs of jaw clutches of said gear set; means including a throttle cylinder for opening and closing said throttle; a first solenoid controlled valve controlling admission of pressure fluid to one end of said shifting cylinder and a second solenoid controlled valve controlling the admission of pressure fluid to the other end of said shifting cylinder; a third solenoid controlled valve controlling the admission of pressure fluid to one side of the throttle controlling cylinder and a fourth solenoid controlled valve controlling admission of fluid to the other side of said throttle controlling cylinder; a speed responsive device operatively connected to the output of said gear set; means responsive to said speed responsive device when the output speed of said gear set exceeds a predetermined first amount for energizing the first of said solenoid controlled valves for urging said shifter in an upshift direction and for energizing the third of said solenoid controlled valves for urging the throttle controlling cylinder in a throttle closing direction, said means including a serially connected switch openable upon the occurrence of sufficient movement of said gear set in upshift direction to initiate engagement of the next pair of jaw clutches to be engaged for deenergizing said throttle controlling cylinder; means responsive to the diminishing of the speed of said speed responsive device below a predetermined second amount for energizing the second solenoid controlled valve for urging said shifter in a downshift direction and for energizing the third of said solenoid controlled valves for urging the throttle controlling cylinder in a throttle closing direction, said means including a switch actuable upon movement of said gear set from a high ratio toward a low ratio position, and prior to the engagement of the gears thereof in a lower ratio position, for deenergizing said third solenoid controlled valve and other means including further switches in series energizing said fourth solenoid controlled valve and thereby opening said throttle a preselected amount which is less than the full open position of said throttle, one of said last named switches being openable upon initiation of engagement of said gear set in its low ratio position for deenergizing said throttle controlling means.

7. In a transmission for a motor vehicle including an engine, a throttle controlling said engine, the combination comprising: a change speed gear set driven by said engine and having pairs of shiftable jaw clutches, said gear set including a balk ring construction between the engageable members of said pairs of shiftable jaw clutches for preventing engagement of a given pair of jaw clutches when the jaw clutches are rotating at other than substantially synchronous speeds; means driven by said engine driving said gear set; a shifter including a shifting cylinder arranged for shifting said pairs of jaw clutches of said gear set; means including a throttle cylinder for opening and closing said throttle; a first solenoid controlled valve controlling admission of pressure fluid to one end of said shifting cylinder and a second solenoid controlled valve controlling the admission of pressure fluid to the other end of said shifting cylinder; a third solenoid controlled valve controlling the admission of pressure fluid to one side of the throttle controlling cylinder and a fourth solenoid controlled valve controlling admission of fluid to the other side of said throttle controlling cylinder, said throttle controlling cylinder having stop means limiting movement thereof in throttle opening direction, said last named means being operative when said throttle is opened by said throttle controlling cylinder and inactive at all other times; a speed responsive device operatively connected to the output of said gear set; means responsive to said speed responsive device when the output speed of said gear set exceeds a predetermined maximum amount for energizing the first of said solenoid controlled valves for urging said shifter in an upshift direction and for energizing the third of said solenoid controlled valves for urging the throttle controlling cylinder in a throttle closing direction, said means including a serially connected switch openable upon the occurrence of sufficient movement of said gear set in an upshift direction to initiate engagement of the next pair of jaw clutches to be engaged for deenergizing said throttle controlling cylinder; means responsive to the diminishing of the speed of said speed responsive device below a predetermined minimum for energizing the second solenoid controlled valve for urging said shifter in a downshift direction and for energizing the third of said solenoid controlled valves for urging the throttle controlling cylinder in a throttle closing direction, said means including a switch actuable upon movement of said gear set from a high ratio toward a low ratio position, and prior to the engagement of the jaw clutches thereof in a lower ratio condition, for deenergizing said third solenoid controlled valve and other means including a pair of serially connected switches energizing said fourth solenoid controlled valve and thereby opening said throttle a preselected amount which is less than the full open position of said throttle, and one of said last named switches being openable upon initiation of engagement of said gear set in its lower ratio position for deenergizing said throttle controlling means.

8. In a transmission for a motor vehicle including an engine and a throttle controlling said engine, the combination comprising: a change speed gear set driven by said engine and having pairs of shiftable jaw clutches, said gear set including means operably associated with the engageable members of said pairs of shiftable jaw clutches for preventing engagement of a given pair of jaw clutches when the jaw clutches are rotating at other than substantially synchronous speeds; means driven by said engine driving said gear set; a shifter including a shifting cylinder arranged for shifting said pairs of jaw clutches of said gear set; means including a throttle cylinder for opening and closing said throttle; a first solenoid controlled valve controlling admission of pressure fluid to one end of said shifting cylinder and a second solenoid controlled valve controlling the admission of pressure fluid to the other end of said shifting cylinder; a third solenoid controlled valve controlling the admission of pressure fluid to one side of the throttle controlling cylinder and a fourth solenoid controlled valve controlling admission of fluid to the other side of said throttle controlling cylinder; a speed responsive device operatively connected to the output of said gear set; means responsive to said speed responsive device when the output speed of said gear set exceeds a predetermined amount for energizing the first of said solenoid controlled valves for urging said shifter in an upshift direction and for energizing the third of said solenoid controlled valves for urging the throttle controlling cylinder in a throttle closing direction, said means including a serially connected switch openable upon the occurrence of sufficient movement of said gear set in an upshift direction to initiate engagement of the next pair of jaw clutches to be engaged for deenergizing said throttle controlling cylinder; means responsive to the diminishing of the speed of said speed responsive device below a predetermined minimum for energizing the second solenoid controlled valve for urging said shifter in a downshift direction and for energizing the third of said solenoid controlled valves for urging the throttle controlling cylinder in a throttle closing direction, said means including a switch actuable upon movement of said gear set from a high ratio position toward a low ratio position, and prior to the engagement of the jaw clutches thereof in a lower ratio condition, for deenergizing said third solenoid controlled valve and other means including a pair of serially connected switches energizing said fourth solenoid controlled valve and thereby opening said throttle a preselected amount which is less than the full open position of said throttle, and one of said last named switches being openable upon initiation of engagement of said gear set in its low ratio position for deenergizing said throttle controlling means.

9. In a transmission for a motor vehicle including an engine, a throttle controlling said engine, the combination comprising: a change speed gear set driven by said engine and having pairs of shiftable jaw clutches, said gear set including a balk ring construction between the engageable members of said pairs of shiftable jaw clutches for preventing engagement of a given pair of jaw clutches when the jaw clutches are rotating at other than substantially synchronous speeds; a shifter including a shifting cylinder arranged for shifting said pairs of said gear set; means including a throttle cylinder for opening and closing said throttle; a first solenoid controlled valve controlling admission of pressure fluid to one end of said shifting cylinder and a second solenoid controlled valve controlling the admission of pressure fluid to the other end of said shifting cylinder; a third solenoid controlled valve controlling the admission of pressure fluid to one side of the throttle controlling cylinder and a fourth solenoid controlled valve controlling admission of fluid to the other side of said throttle controlling cylinder; a speed responsive device operatively connected to the output of said gear set; means responsive to said speed responsive device when the output speed of said gear set exceeds a predetermined amount for energizing the first of said solenoid controlled valves for urging said shifter in an upshift direction and for energizing the third of said solenoid controlled valves for urging the throttle controlling cylinder in a throttle closing direction.

10. In a transmission for a motor vehicle including an engine and a throttle controlling said engine, the combination comprising: a change speed gear set driven by said engine and having a pair of shiftable toothed elements, said gear set including blocking means for preventing engagement of a pair of toothed elements when the toothed elements are rotating at other than substantially synchronous speeds; a shifter arranged for shifting said pair of toothed elements; first electrically initiated and fluid operated operating means connected to said shifter for engaging and disengaging said pair of shiftable toothed elements; second electrically initiated and fluid operated operating means connected to said throttle for opening and closing same; electrically energized means responsive to the output speed of said gear set for activating said first operating means and initiating activation of said second operating means and other means responsive to the position of said gear set for terminating activation of said second operating means.

11. In a transmission for a motor vehicle including an engine and a throttle controlling said engine, the combination comprising: a change speed gear set driven by said engine and having a pair of shiftable jaw clutches; a shifter arranged for shifting said pair of jaw clutches; first fluid operated and electrically initiated operating means connected to said shifter for engaging and disengaging said pair of shiftable jaw clutches; second fluid operated and electrically initiated operating means connected to said throttle for opening and closing same; electrically energized means responsive to the output speed of said gear set for activating said first operating means and for initiating activation of said second operating means and other electrical means serially connected with the electrically energized portion of said first operating means responsive to the position of said gear set for terminating activation of said second operating means.

12. In a transmission for a motor vehicle including an engine and a throttle controlling said engine, the combination comprising: a change speed gear set driven by said engine and having pairs of shiftable jaw clutches; a shifter including a shifting cylinder arranged for shifting said pairs of said gear set; means including a throttle cylinder for opening and closing said throttle; a first solenoid controlled valve controlling admission of pressure fluid to one end of said shifting cylinder and a second solenoid controlled valve controlling the admission of pressure fluid to the other end of said shifting cylinder; a third solenoid controlled valve controlling the admission of pressure fluid to one side of the throttle controlling cylinder and a fourth solenoid controlled valve controlling admission of fluid to the other side of said throttle controlling cylinder; means responsive to said speed responsive device when the output speed of said gear set exceeds a predetermined amount for energizing the first of said solenoid controlled valves for urging said shifter in an upshift direction and for energizing the third of said solenoid controlled valves for urging the throttle controlling cylinder in a throttle closing direction; said last named means including a switch openable upon initiation of engagement of said gear set in its shifted position for urging said throttle controlling cylinder in a throttle opening direction.

13. In a transmission for a motor vehicle including an engine and a throttle controlling said engine, the combination comprising: a change speed gear set driven by said engine and having pairs of shiftable jaw clutches; a shifter including a shifting cylinder arranged for shifting said pairs of said gear set; means including a throttle cylinder for opening and closing said throttle; a first solenoid controlled valve controlling admission of pressure fluid to one end of said shifting cylinder and a second solenoid controlled valve controlling the admission of pressure fluid to the other end of said shifting cylinder; a third solenoid controlled valve controlling the admission of pressure fluid to one side of the throttle controlling cylinder and a fourth solenoid controlled valve controlling admission of fluid to the other side of said throttle controlling cylinder; a speed responsive device operatively connected to the output of said gear set; means responsive to said speed responsive device when the output speed of said gear set exceeds a predetermined amount for energizing the first of said solenoid controlled valves for urging said shifter in an upshift direction and for energizing the third of said solenoid controlled valves for urging the throttle controlling cylinder in a throttle closing direction; said last named means including a switch openable upon initiation of engagement of said gear set in its shifted position for urging said throttle controlling cylinder in a throttle opening direction; and means responsive to said speed responsive device when the output speed of said gear set falls below a predetermined amount for energizing the second of said solenoids for urging said shifter in a downshift direction and for simultaneously energizing the third of said solenoids to effect a closing of said throttle.

14. The combination of claim 13 including means responsive to movement of said shifter in a downshift direction for deenergizing the third of said solenoids and subsequently energizing the fourth of said solenoids to effect an opening of said throttle.

15. In a transmission for a motor vehicle including an engine and means controlling the speed of said engine, the combination comprising: a change speed gear set driven by said engine and having a pair of shiftable jaw clutches, said gear set including means operable with the respective clutch elements of said pair of shiftable jaw clutches for preventing engagement of said pair of clutches when the teeth thereof are rotating at other than substantially synchronous speeds; a shifter arranged for shifting said pair of jaw clutches; first fluid pressure operated means connected to said shifter for engaging and disengaging said pair of shiftable jaw clutches; second fluid pressure operated means connected to said means controlling the speed of said engine for actuating same; means responsive to the output speed of said gear set for activating said first and second fluid pressure means and other means responsive to the position of said gear set for terminating activation of said second fluid pressure means.

References Cited in the file of this patent
UNITED STATES PATENTS

| | | |
|---|---|---|
| 1,891,678 | Mayback | Dec. 20, 1932 |
| 1,911,599 | Bloxsom | May 30, 1933 |
| 1,979,488 | Perez | Nov. 6, 1934 |
| 2,104,608 | Cox et al. | Jan. 4, 1938 |
| 2,616,538 | Price | Nov. 4, 1952 |
| 2,626,690 | Price | Jan. 27, 1953 |